(12) United States Patent
Morikawa et al.

(10) Patent No.: US 12,675,153 B2
(45) Date of Patent: Jul. 7, 2026

(54) SYSTEM FOR CHANGING A POSITION OF A VIRTUAL OBJECT

(71) Applicant: FUJIFILM Business Innovation Corp., Tokyo (JP)

(72) Inventors: Takashi Morikawa, Kanagawa (JP); Kiyoshi Iida, Kanagawa (JP); Toshihiko Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,160

(22) Filed: Mar. 3, 2023

(65) Prior Publication Data

US 2024/0094802 A1     Mar. 21, 2024

(30) Foreign Application Priority Data

Sep. 16, 2022 (JP) ................................. 2022-147641

(51) Int. Cl.
*G06F 3/01* (2006.01)
*G06V 40/20* (2022.01)

(52) U.S. Cl.
CPC .............. *G06F 3/011* (2013.01); *G06F 3/017* (2013.01); *G06V 40/20* (2022.01)

(58) Field of Classification Search
CPC ........ G06F 3/011; G06F 3/017; G06F 3/0304; G06V 40/20; G06V 40/28; G06T 19/006; G06T 7/593; G06T 7/60; G06T 17/00; G06T 2200/08; G06T 2207/10012; G06T 2207/30168; G06T 2207/30196; G06T 2207/30244
See application file for complete search history.

(56) References Cited

U.S. PATENT DOCUMENTS

| | | | |
|---|---|---|---|
| 10,692,291 B2 | 6/2020 | Koga | |
| 11,260,287 B2 | 3/2022 | Ohashi | |
| 2013/0265235 A1* | 10/2013 | Cai | G06F 3/0488 345/169 |
| 2018/0336733 A1 | 11/2018 | Koga | |
| 2019/0087020 A1* | 3/2019 | Robinson | G06F 3/0346 |

(Continued)

FOREIGN PATENT DOCUMENTS

| | | |
|---|---|---|
| JP | 2018-110871 A | 7/2018 |
| JP | 6651388 B2 | 2/2020 |

(Continued)

OTHER PUBLICATIONS

Sueishi, Tomohiro et al., "Prototype of Nail Markers for High-speed Fingertip Pose Estimation", Collection of Papers from The 24th Annual Conference of the Virtual Reality Society of Japan, Sep. 2019, 5C-07.

(Continued)

*Primary Examiner* — Rodney Amadiz
(74) *Attorney, Agent, or Firm* — Oliff PLC

(57) ABSTRACT

An information processing system includes at least one processor configured to: acquire a captured image including an image of a thumb of a user; and switch an operation mode for a virtual object disposed within a virtual space to a specific mode for positionally changing the virtual object if the captured image includes an image of a nail of the thumb or an image that enables estimation of presence of the nail of the thumb.

8 Claims, 7 Drawing Sheets

(56)                    References Cited

U.S. PATENT DOCUMENTS

| | | | |
|---|---|---|---|
| 2021/0141444 A1* | 5/2021 | Speelman | ............... G06F 3/012 |
| 2025/0076989 A1* | 3/2025 | Fieldman | ............ G06F 3/04845 |
| 2025/0292484 A1* | 9/2025 | Yang | ......................... G06T 7/11 |

FOREIGN PATENT DOCUMENTS

| | | | |
|---|---|---|---|
| JP | 6955369 | B2 | 10/2021 |
| JP | 2022-28692 | A | 2/2022 |
| JP | 2022-028692 | A | 2/2022 |

OTHER PUBLICATIONS

Jan. 27, 2026 Office Action issued in Japanese Patent Application No. 10-2022-147641.
May 19 Office Action issued in Japanese Patent Application No. 2022-147641.

* cited by examiner

TN

SYSTEM FOR CHANGING A POSITION OF A VIRTUAL OBJECT

CROSS-REFERENCE TO RELATED APPLICATIONS

This application is based on and claims priority under 35 USC 119 from Japanese Patent Application No. 2022-147641 filed Sep. 16, 2022.

BACKGROUND

(i) Technical Field

The present disclosure relates to information processing systems and non-transitory computer readable media.

(ii) Related Art

Japanese Patent No. 6651388 describes a gesture modeling apparatus that detects a recessed area of a finger by using a strength-smoothed depth image, recognizes a holding motion of a user based on the detection result, and receives a user operation by defining a fingertip position and/or a fingertip orientation using planar approximation of a finger area based on a multiple regression analysis.

Japanese Patent No. 6955369 describes an information processing apparatus that displays a guide image indicating an appropriate finger orientation in the measurement of the dimensions of a finger, analyzes a photographed image of the finger to determine whether the photographed image is an appropriate photographed image for measuring the dimensions of the finger, measures the dimensions of the finger by using the photographed image determined as being appropriate, and generates a three-dimensional model of the finger by using information about the dimensions.

According to Sueishi, Tomohiro; Ishikawa, Masatoshi; *Prototype of Nail Markers for High-speed Fingertip Pose Estimation*; Collection of Papers from The 24th Annual Conference of the Virtual Reality Society of Japan (September 2019); 5C-07, a nail marker with a low-restrictive minute rigid curved surface is proposed for fingertip pose estimation application that demands low latency, as in dynamic projection mapping. Such a nail marker is intended to be used in a high-speed optical-axis control meter that realizes continual and high resolution image measurement, and is actually prototyped by using nail printing.

SUMMARY

An operation mode for a virtual object disposed within a virtual space may sometimes be switched to a mode for positionally changing the virtual object. In such a case, the use of a controller for performing the switching may involve an additional operation and may lead to a difficulty in performing the switching with a natural human motion.

Aspects of non-limiting embodiments of the present disclosure relate to an ability to switch an operation mode for a virtual object disposed within a virtual space to a mode for positionally changing the virtual object in accordance with a natural human motion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising at least one processor configured to: acquire a captured image including an image of a thumb of a user; and switch an operation mode for a virtual object disposed within a virtual space to a specific mode for positionally changing the virtual object if the captured image includes an image of a nail of the thumb or an image that enables estimation of presence of the nail of the thumb.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail below with reference to the appended drawings.

Overview of Exemplary Embodiment

This exemplary embodiment provides an information processing system that acquires a captured image including an image of a user's thumb and that switches an operation mode for a virtual object disposed within a virtual space to a specific mode for positionally changing the virtual object if the captured image includes an image of a thumbnail or an image that enables estimation of the presence of the thumbnail.

The term "virtual space" refers to a space that simulates a real space serving as a real-world space and that is virtually established in a computer. The term "virtual object" refers to an object that simulates a real object serving as a real-world object and that is disposed within the virtual space.

Examples of the specific mode for positionally changing the virtual object include a movement mode for moving the virtual object and a rotation mode for rotating the virtual object. The following description relates to the movement mode for moving the virtual object as an example.

Furthermore, the virtual space is implemented by using a head mounted display (HMD) worn by the user, and an HMD system is described as an example of the information processing system.

Specific operation of the HMD system will now be described. The HMD system is capable of detecting the orientation of the user's thumbnail within the virtual space by using a natural image of the nail or a marker given to the nail.

The HMD system switches the operation mode for the virtual object to the movement mode for moving the virtual object if the thumbnail is oriented in a viewable state from the user in the captured image of the user's thumb. Since the virtual object is to be held for moving the virtual object, the movement mode for moving the virtual object may also be regarded as a mode for holding the virtual object.

Figure 1:
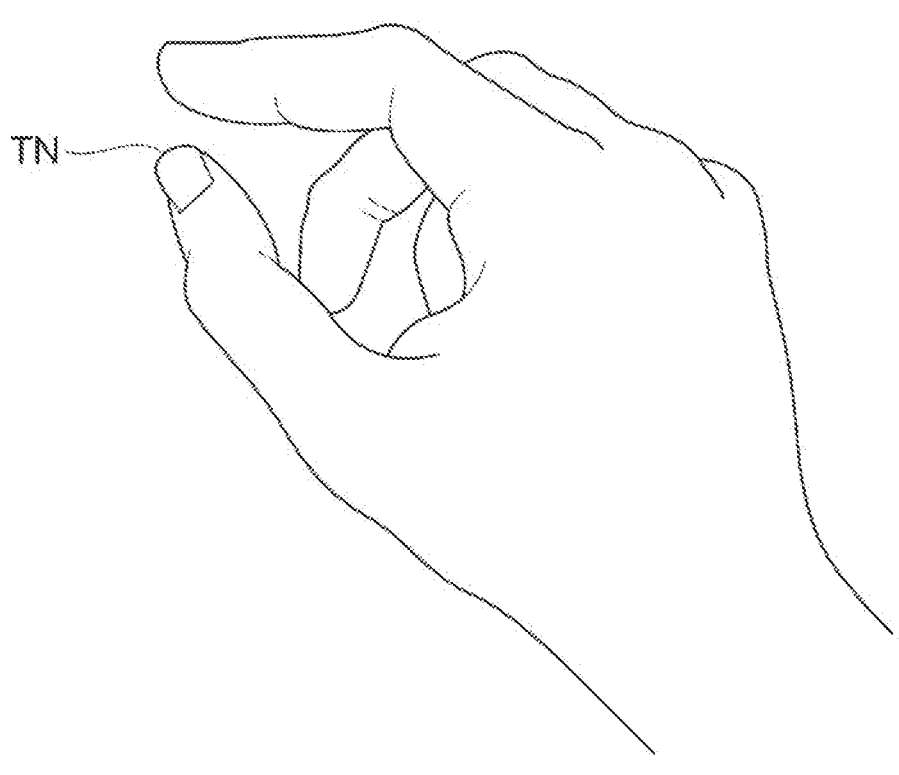
FIG. 1 illustrates a captured image of a thumb of a user.

FIG. 1 illustrates such a captured image. In this captured image, a thumbnail TN of the user is oriented in a viewable state from the user. Accordingly, the HMD system switches the operation mode for the virtual object to the movement mode.

Furthermore, in this case, the HMD system sets a contact determination area CD in a space opposite the user's thumbnail TN.

Figure 2:
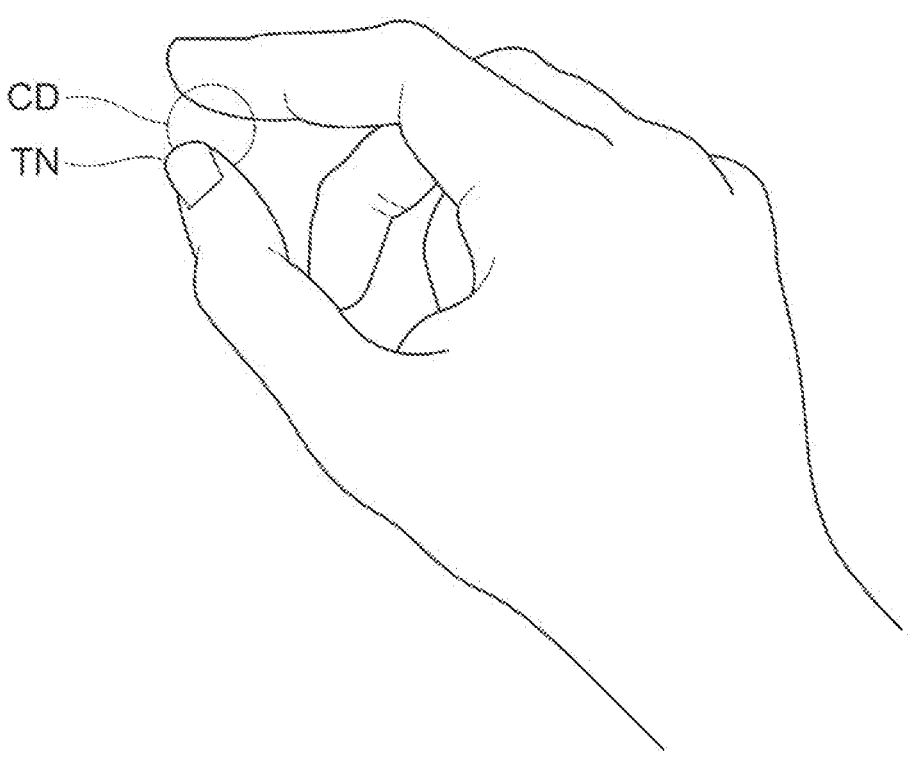
FIG. 2 illustrates a state where a contact determination area is set.

FIG. 2 illustrates a state where such a contact determination area CD is set. For example, the contact determination area CD is a spherical area that is in contact with the pulp of the user's thumb.

The HMD system selects the virtual object entering the contact determination area CD as a target virtual object to be moved, that is, a target virtual object to be held.

Then, the HMD system detects a holding motion by the user and displays a display image indicating the virtual object in a held state.

Figure 3:
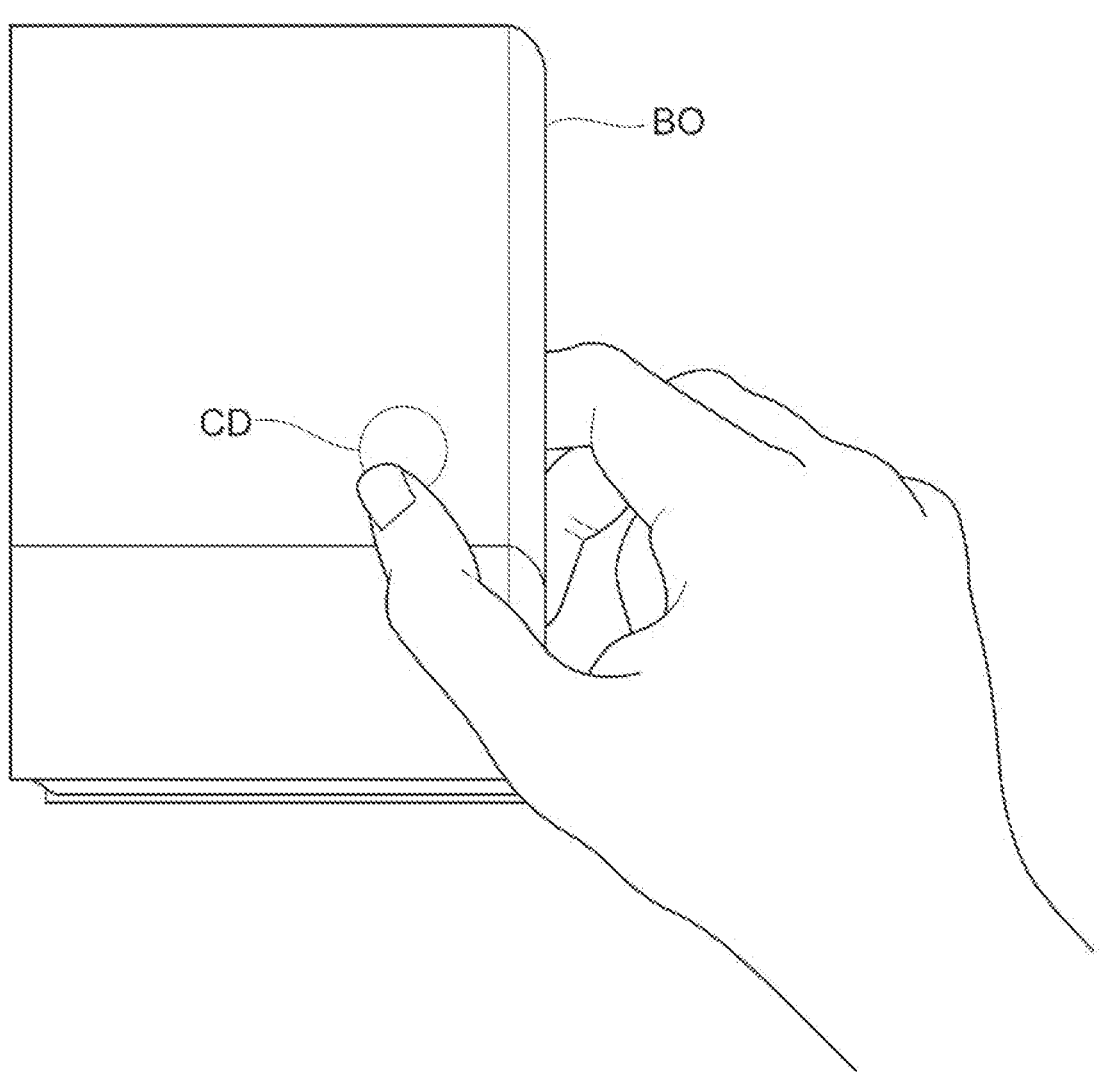
FIG. 3 illustrates a display image indicating a virtual object in a held state.

FIG. 3 illustrates such a display image. The display image indicates a state where a virtual object BO that simulates a book has entered the contact determination area CD, the virtual object BO is selected as a target virtual object to be held, and the virtual object BO is held.

Overall Configuration of HMD System

Figure 4:
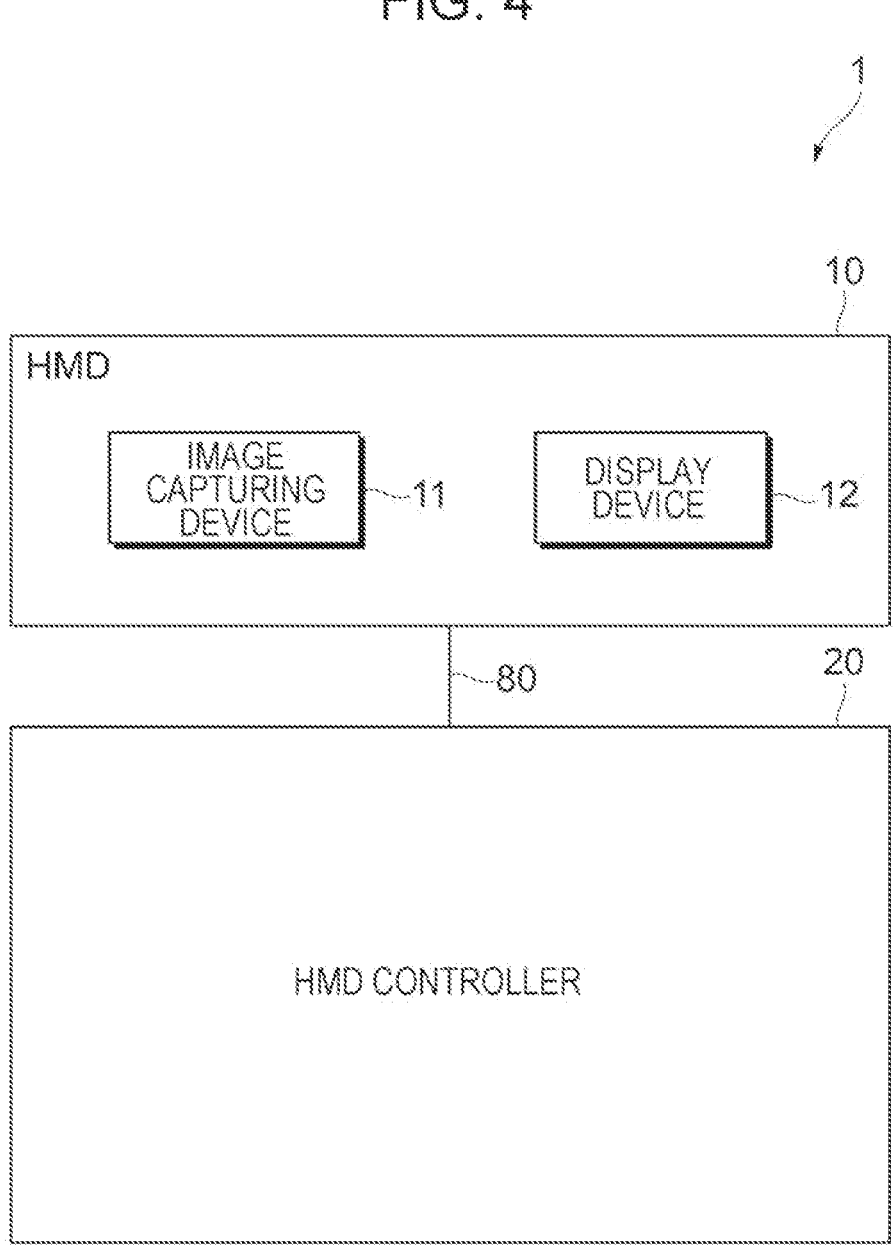
FIG. 4 illustrates an overall configuration example of a head mounted display (HMD) system according to this exemplary embodiment.

FIG. 4 illustrates an overall configuration example of an HMD system 1 according to this exemplary embodiment. As shown in FIG. 4, the HMD system 1 includes an HMD 10 and an HMD controller 20 that are connected to a communication line 80.

The HMD 10 is a head mountable display that is to be worn by the user so as to be capable of showing a virtual reality (VR) or augmented reality (AR) based virtual space to the user. The HMD 10 includes an image capturing device 11 that captures an image of the real space in front of the user's eyes and a display device 12 that displays a display image generated by the HMD controller 20.

The HMD controller 20 generates a display image to be displayed by the display device 12 based on the captured image obtained by the image capturing device 11 of the HMD 10. The HMD controller 20 used may be, for example, a personal computer.

The communication line 80 is a signal line used for information communication between the HMD 10 and the HMD controller 20. The communication line 80 used may be, for example, a universal serial bus (USB) cable.

Hardware Configuration of HMD Controller

Figure 5:
FIG. 5 illustrates a hardware configuration example of an HMD controller according to this exemplary embodiment.
Figure 5:
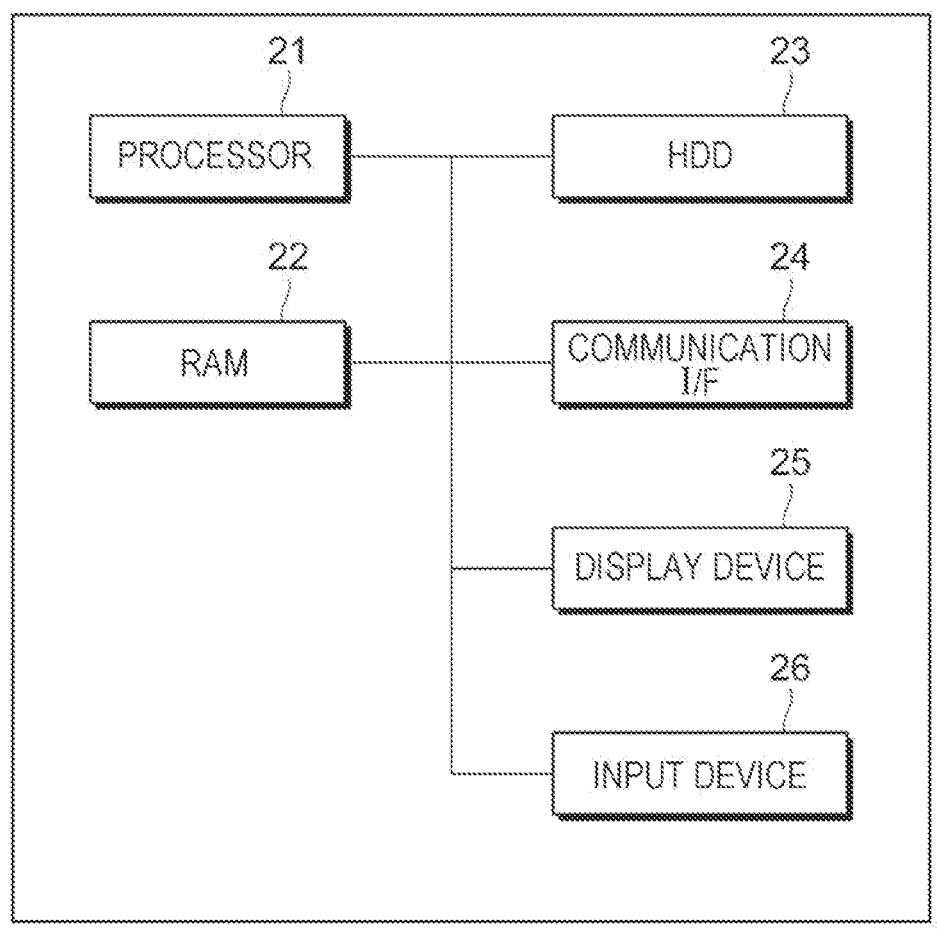

FIG. 5 illustrates a hardware configuration example of the HMD controller 20 according to this exemplary embodiment. As shown in FIG. 5, the HMD controller 20 includes a processor 21, a random access memory (RAM) 22, a hard disk drive (HDD) 23, a communication interface (I/F) 24, a display device 25, and an input device 26.

The processor 21 executes various types of software, such as an operating system (OS) and an application, so as to implement various types of functions to be described below.

The RAM 22 is a memory used as, for example, a working memory of the processor 21.

The HDD 23 is, for example, a magnetic disk device that stores data input to the various types of software and data output from the various types of software.

The communication I/F 24 exchanges various types of information with the HMD 10 via the communication line 80.

The display device 25 is, for example, a display that displays various types of information.

The input device 26 is, for example, a keyboard and/or a mouse used by the user for inputting information.

Functional Configuration of HMD Controller

Figure 6:
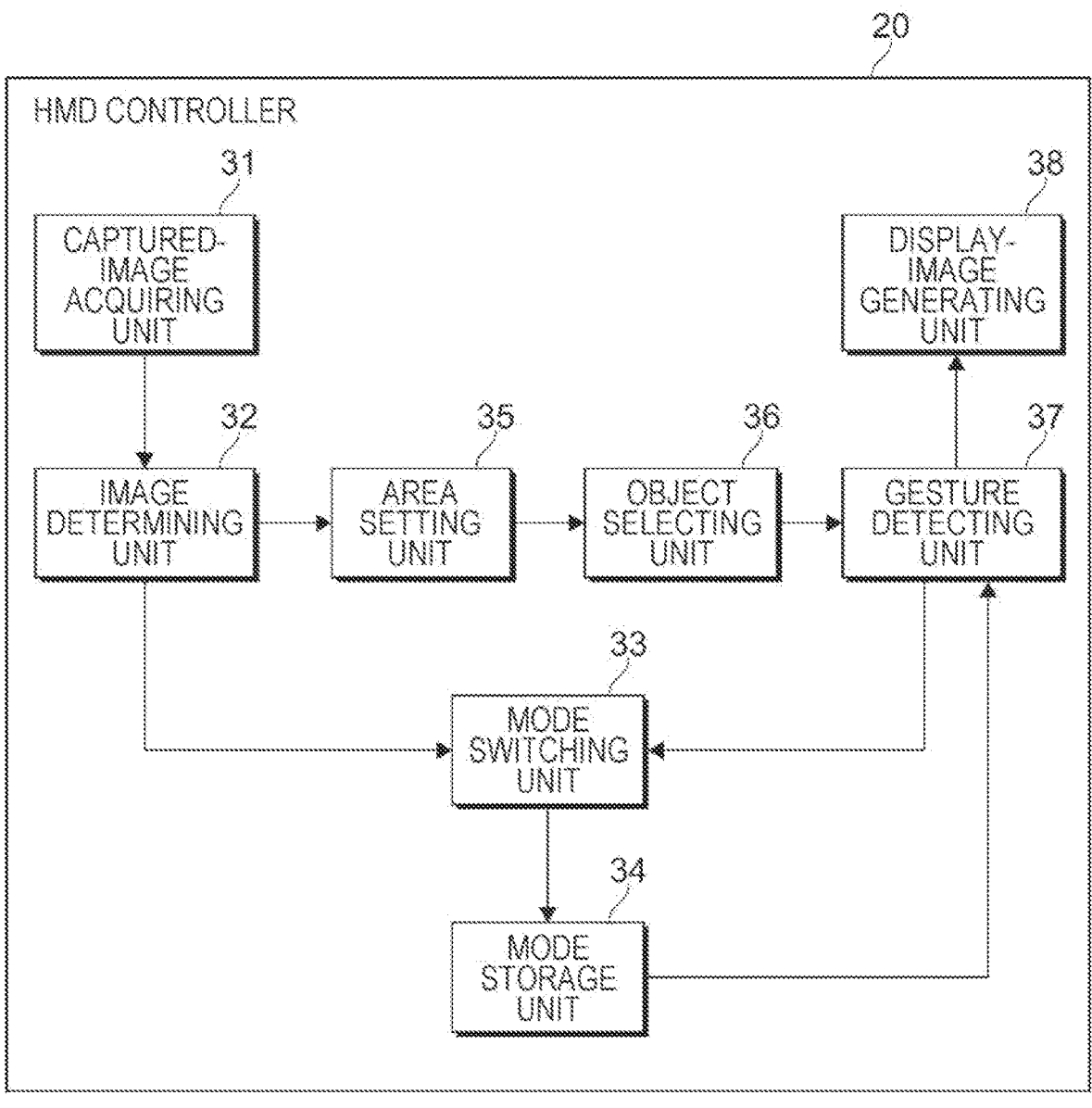
FIG. 6 is a block diagram illustrating a functional configuration example of the HMD controller according to this exemplary embodiment.

FIG. 6 is a block diagram illustrating a functional configuration example of the HMD controller 20 according to this exemplary embodiment. As shown in FIG. 6, the HMD controller 20 includes a captured-image acquiring unit 31, an image determining unit 32, a mode switching unit 33, a mode storage unit 34, an area setting unit 35, an object selecting unit 36, a gesture detecting unit 37, and a display-image generating unit 38.

The captured-image acquiring unit 31 acquires the captured image obtained by the image capturing device 11 of the HMD 10. When operating the virtual object, the user moves his/her hand into an image capturing range of the image capturing device 11. Thus, the captured image includes an image of the user's thumb. In this exemplary embodiment, the captured-image acquiring unit 31 performs a process as an example of acquiring the captured image including the image of the thumb of the user.

The image determining unit 32 determines whether or not the user's thumbnail is oriented in a viewable state from the user based on the captured image acquired by the captured-image acquiring unit 31. Since the image capturing device 11 of the HMD 10 worn by the user has captured the image of the user's thumb, the image determining unit 32 determines whether or not the captured image acquired by the captured-image acquiring unit 31 includes the image of the user's thumbnail.

In detail, the image determining unit 32 first detects an outline of the hand from the captured image and extracts a region surrounded by the outline as an image of the hand. In particular, since the ultimate objective of the image determining unit 32 is to determine whether or not the captured image includes the image of the thumbnail, the image determining unit 32 extracts an image of the back of the hand from the captured image. For example, the image determining unit 32 may extract the image of the back of the hand based on the skin color contrast between the back of the hand and the palm of the hand. Alternatively, the image determining unit 32 may extract the image of the back of the hand based on wrinkle or hair features between the back of the hand and the palm of the hand. As another alternative, the image determining unit 32 may extract the image of the back of the hand by detecting fingernails.

Subsequently, the image determining unit 32 extracts fingernail images from the extracted image of the back of the hand. For example, if the captured image is a monochrome image, the image determining unit 32 may extract bright regions of fingertips in the hand image as the fingernail images. If the captured image is a color image, the image determining unit 32 may extract fingernail-color regions of the fingertips in the hand image as the fingernail images. This method for extracting the fingernail images may also be used for detecting fingernails in the extraction of the aforementioned image of the back of the hand.

Then, the image determining unit 32 extracts an image of the thumbnail from the extracted fingernail images. Since it is difficult to determine which extracted fingernail image corresponds to a fingernail image of which finger, for example, the image determining unit 32 may calculate a three-dimensional shape of the hand from the hand image, establish a finger model expressing the three-dimensional shape, and use the finger model to determine which finger-nail image corresponds to a fingernail image of which finger.

Subsequently, the image determining unit 32 estimates the orientation of the thumbnail from the extracted image of the thumbnail. For example, the image determining unit 32 may estimate the orientation of the thumbnail from the area of the observed thumbnail relative to the area of the fingernails when the thumbnail is viewed from the front.

Alternatively, the image determining unit 32 may use markers given to the fingernails. In detail, patterns may be printed on the surface of the markers, and the image deter-mining unit 32 may use these patterns in the extraction of the image of the back of the hand by detecting the fingernails, the extraction of the fingernail images, the extraction of the image of the thumbnail, and the estimation of the orientation of the thumbnail.

The thumbnail may sometimes be hidden when the held virtual object is turned over for viewing the rear side thereof. The image determining unit 32 may determine whether or not the captured image acquired by the captured-image acquiring unit 31 includes an image that enables estimation of the presence of the user's thumbnail. An example of the image that enables estimation of the presence of the user's thumbnail is an image of an area extending from the base of the thumb to the first joint thereof.

In addition, the image determining unit 32 may determine whether or not the captured image includes the image of the user's thumbnail or the image that enables estimation of the presence of the user's thumbnail by causing an artificial intelligence (AI) to mechanically learn the aforementioned image as teacher learning data.

If the image determining unit 32 determines that the captured image includes the image of the user's thumbnail, the mode switching unit 33 switches the operation mode for the virtual object to the movement mode for moving the virtual object disposed within the virtual space. For example, if the image determining unit 32 determines that the captured image includes the image of the user's thumb-nail in a state where the user's thumbnail is oriented in a viewable state from the user, the mode switching unit 33 switches the operation mode for the virtual object to the movement mode. Alternatively, if the image determining unit 32 determines that the captured image includes the image that enables estimation of the presence of the user's thumbnail, the mode switching unit 33 may switch the operation mode for the virtual object disposed within the virtual space to the movement mode for moving the virtual object. In this exemplary embodiment, if the captured image includes the image of the thumbnail or the image that enables estimation of the presence of the thumbnail, the mode switching unit 33 performs a process as an example of switching the operation mode for the virtual object disposed within the virtual space to the specific mode for positionally changing the virtual object. Furthermore, in this exemplary embodiment, if the user's thumbnail is oriented toward the user, the mode switching unit 33 performs a process as an example of switching the operation mode for the virtual object disposed within the virtual space to the specific mode for positionally changing the virtual object.

After switching the operation mode for the virtual object to the movement mode, the mode switching unit 33 may maintain the movement mode even if the captured image temporarily does not include the image of the user's thumbnail or the image that enables estimation of the presence of the user's thumbnail. Then, if the gesture detecting unit 37 detects a predetermined gesture, the mode switching unit 33 may terminate the movement mode. The predetermined gesture includes, but not limited to, a gesture for releasing the virtual object held by the user. In this case, the process performed by the mode switching unit 33 is an example of proceeding with the specific mode until a predetermined motion is detected after the operation mode is switched to the specific mode even if the captured image does not include the image of the thumbnail or the image that enables estimation of the presence of the thumbnail.

The mode storage unit 34 stores the operation mode for the virtual object disposed within the virtual space. Examples of the operation mode include a selection mode for selecting the virtual object and the movement mode for moving the virtual object. For example, when the mode switching unit 33 switches the operation mode to the move-ment mode, the mode storage unit 34 stores the movement mode serving as an operation mode after the switching process. When the mode switching unit 33 terminates the movement mode, the movement mode stored in the mode storage unit 34 is deleted therefrom.

When the image determining unit 32 determines that the captured image includes the image of the user's thumbnail or the image that enables estimation of the presence of the user's thumbnail, the area setting unit 35 sets a contact determination area opposite the thumbnail within the virtual space. The contact determination area may be, for example, a spherical area that is in contact with the pulp of the user's thumb. In this case, the contact determination area may be defined as an area centered on a point located at a prede-termined distance from the center of the pulp of the thumb and having the predetermined distance as a radius. In this exemplary embodiment, the contact determination area is used as an example of a specific area serving as an area within the virtual space corresponding to an area at the pulp side of the thumb. Furthermore, in this exemplary embodi-ment, the contact determination area is used as an example of a specific area serving as an area that is in contact with a plane within the virtual space corresponding to the pulp surface of the thumb.

The object selecting unit 36 determines whether or not the virtual object has entered the contact determination area set by the area setting unit 35. For example, assuming that the contact determination area is the aforementioned spherical area, the object selecting unit 36 may determine that the virtual object has entered the contact determination area when the distance from the center of the sphere to any point on the virtual object becomes smaller than the radius of the sphere. Then, when the object selecting unit 36 determines that the virtual object has entered the contact determination area, the object selecting unit 36 selects this virtual object as a virtual object to be moved. In this exemplary embodiment, the object selecting unit 36 performs a process as an example of recognizing a virtual object at least partially existing within the specific area as a target virtual object to be positionally changed.

The gesture detecting unit 37 detects a gesture of the user in accordance with the operation mode stored in the mode storage unit 34.

For example, if the selection mode is stored as the operation mode in the mode storage unit 34, the gesture detecting unit 37 detects a gesture for selecting the virtual object.

If the movement mode is stored as the operation mode in the mode storage unit 34, the gesture detecting unit 37 detects a gesture for moving the virtual object. In particular, the gesture detecting unit 37 detects a user's holding gesture. For example, the gesture detecting unit 37 may detect the user's holding gesture when there is no gap between the pulp of the thumb and the pulp of the index finger. Alternatively, the gesture detecting unit 37 may detect the user's holding gesture when a circle created by the thumb and the index finger is recognizable. The gesture detecting unit 37 also detects the gesture for releasing the virtual object held by the user.

The display-image generating unit 38 combines the captured image acquired by the captured-image acquiring unit 31 with the image of the virtual object selected by the object selecting unit 36 so as to generate a display image to be displayed on the display device 12 of the HMD 10. In particular, if the gesture detecting unit 37 detects the user's holding gesture, the display-image generating unit 38 generates a display image indicating a state where the virtual object selected by the object selecting unit 36 is held. If the gesture detecting unit 37 detects the user's releasing gesture, the display-image generating unit 38 generates a display image indicating a state where the previously-held virtual object is released. Then, the display-image generating unit 38 outputs the display image to the display device 12 of the HMD 10.

Operation Example of HMD Controller

Figure 7:
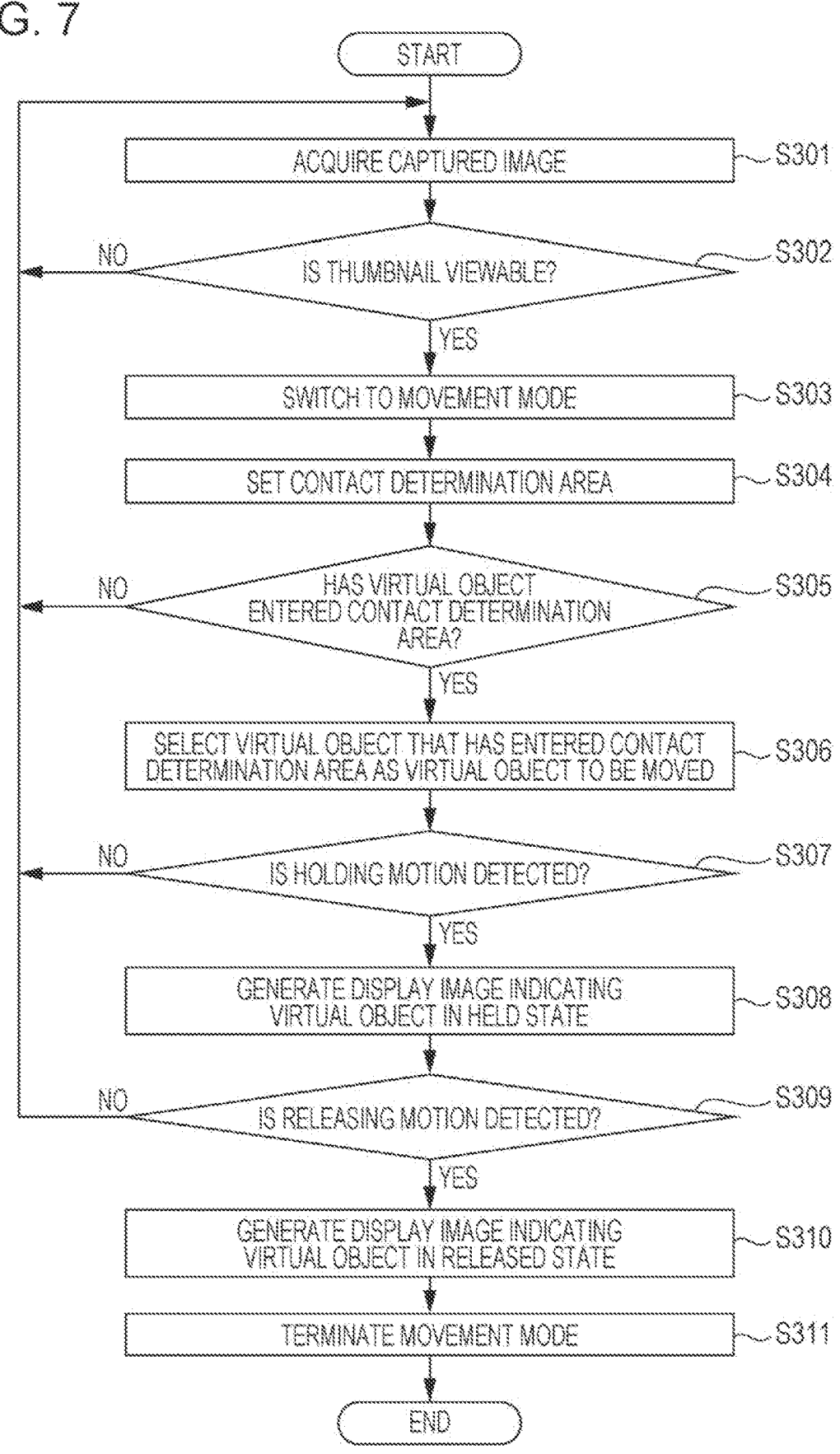
FIG. 7 is a flowchart illustrating an operation example of the HMD controller according to this exemplary embodiment.

FIG. 7 is a flowchart illustrating an operation example of the HMD controller 20 according to this exemplary embodiment. The following description focuses on determining whether or not the captured image includes the image of the user's thumbnail but not determining whether or not the captured image includes the image that enables estimation of the presence of the user's thumbnail.

In step S301, the captured-image acquiring unit 31 in HMD controller 20 acquires the captured image from the image capturing device 11 of the HMD 10.

In step S302, the image determining unit 32 determines whether or not the thumbnail in the captured image acquired in step S301 is oriented in a viewable state from the user.

If it is determined in step S302 that the thumbnail is not in a viewable state from the user, the HMD controller 20 returns to step S301.

If it is determined in step S302 that the thumbnail is in a viewable state from the user, the mode switching unit 33 switches the operation mode for the virtual object to the movement mode in step S303. Accordingly, information indicating that the operation mode has been switched to the movement mode is stored in the mode storage unit 34. Then, in step S304, the area setting unit 35 sets a contact determination area opposite the thumbnail within the virtual space.

In step S305, the object selecting unit 36 determines whether or not the virtual object has entered the contact determination area set in step S304.

If it is determined in step S305 that the virtual object has not entered the contact determination area, the HMD controller 20 returns to step S301.

If it is determined in step S305 that the virtual object has entered the contact determination area, the object selecting unit 36 selects this virtual object in step S306 as a virtual object to be moved.

In step S307, the gesture detecting unit 37 determines whether or not a holding motion is detected.

If it is determined in step S307 that a holding motion is not detected, the HMD controller 20 returns to step S301.

If it is determined in step S307 that a holding motion is detected, the display-image generating unit 38 generates a display image indicating a state where the virtual object selected in step S306 is held in step S308. Accordingly, the display image is output to the display device 12 of the HMD 10.

In step S309, the gesture detecting unit 37 determines whether or not a releasing motion for releasing the held virtual object is detected.

If it is determined in step S309 that a releasing motion is not detected, the HMD controller 20 returns to step S301.

If it is determined in step S309 that a releasing motion is detected, the process proceeds to step S310 where the display-image generating unit 38 generates a display image indicating a state where the previously-held virtual object in the display image generated in step S308 is released. Then, in step S311, the mode switching unit 33 terminates the movement mode previously switched in step S303. Consequently, the information stored in the mode storage unit 34 and indicating that the operation mode has been switched to the movement mode is deleted.

Modifications

As an alternative to the above description in which the HMD system 1 including the HMD 10 and the HMD controller 20 realizes the above exemplary embodiment, for example, the HMD 10 may realize the exemplary embodiment. In this case, the captured-image acquiring unit 31, the image determining unit 32, the mode switching unit 33, the mode storage unit 34, the area setting unit 35, the object selecting unit 36, the gesture detecting unit 37, and the display-image generating unit 38 are all provided within the HMD 10.

In the above description, the image capturing device 11 of the HMD 10 is configured to capture an image of the user's thumb, so that the HMD controller 20 is configured to determine whether or not the captured image includes an image of the thumbnail to determine whether or not the thumbnail is oriented in a viewable state from the user. Alternatively, a conceivable example involves the use of Leap Motion (registered trademark) by Leap Motion, Inc. instead of using the HMD 10. If an image of the user's thumb is to be captured from an image capturing device installed at a location other than the user side in this manner, it may be determined whether or not the thumbnail is oriented in a viewable state from the user based on how the thumbnail is viewed from the image capturing device when the thumbnail is oriented in a viewable state from the user. In this case, for example, the virtual object may be displayed in midair by using a hologram or spray instead of using the display device 12 of the HMD 10.

Processor

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the embodiments above, and may be changed.

Program

The process performed by the HMD controller 20 in the above exemplary embodiment is prepared as, for example, a program, such as application software.

In this case, the program that implements the exemplary embodiment is regarded as a program for causing a computer to realize a function for acquiring a captured image including an image of a user's thumb and a function for switching an operation mode for a virtual object disposed within a virtual space to a specific mode for positionally changing the virtual object if the captured image includes an image of a thumbnail or an image that enables estimation of the presence of the thumbnail.

The program that implements the exemplary embodiment may be provided by a communication unit or by being stored in a storage medium, such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system comprising:
  at least one processor configured to:
    acquire a captured image including an image of a thumb of a user; and
    switch an operation mode for a virtual object disposed within a virtual space to a specific mode for positionally changing the virtual object if the captured image includes an image of a nail of the thumb or an image that enables estimation of presence of the nail of the thumb.

(((2)))

The information processing system according to (((1))), wherein the specific mode comprises a movement mode for moving the virtual object or a rotation mode for rotating the virtual object.

(((3)))

The information processing system according to (((1))) or (((2))), wherein the at least one processor is configured to recognize a virtual object at least partially existing within a specific area as a target virtual object to be positionally changed, the specific area serving as an area within the virtual space corresponding to an area at a pulp side of the thumb.

(((4)))

The information processing system according to (((3))), wherein the specific area comprises an area that is in contact with a plane within the virtual space corresponding to a pulp surface of the thumb.

(((5)))

The information processing system according to any one of (((1))) to (((4))), wherein the at least one processor proceeds with the specific mode until a predetermined motion is detected after the operation mode is switched to the specific mode even if the captured image does not include the image of the nail of the thumb or the image that enables the estimation of the presence of the nail of the thumb.

(((6)))

The information processing system according to (((5))), wherein the predetermined motion comprises a motion for releasing the positionally-changed virtual object.

(((7)))

An information processing system comprising:
  at least one processor configured to:
    switch an operation mode for a virtual object disposed within a virtual space to a specific mode for positionally changing the virtual object if a thumbnail of a user is oriented toward the user.

(((8)))

A program causing a computer to execute a process, the process comprising:
  acquiring a captured image including an image of a thumb of a user; and
  switching an operation mode for a virtual object disposed within a virtual space to a specific mode for positionally changing the virtual object if the captured image includes an image of a nail of the thumb or an image that enables estimation of presence of the nail of the thumb.

What is claimed is:

1. An information processing system comprising:
  a camera configured to capture images, including an image of a thumb of a user;
  a display configured to display, to the user, a virtual space with a virtual object disposed within the virtual space; and
  at least one processor configured to:
    acquire the image of the thumb of the user; and
    switch an operation mode for the virtual object to a specific mode for positionally changing the virtual object if the captured image includes an image of a nail of the thumb or an image that enables estimation of presence of the nail of the thumb.

2. The information processing system according to claim 1, wherein the specific mode comprises a movement mode for moving the virtual object or a rotation mode for rotating the virtual object.

3. The information processing system according to claim 1, wherein the at least one processor is configured to recognize a virtual object at least partially existing within a specific area as a target virtual object to be positionally changed, the specific area serving as an area within the virtual space corresponding to an area at a pulp side of the thumb.

4. The information processing system according to claim 3, wherein the specific area comprises an area that is in contact with a plane within the virtual space corresponding to a pulp surface of the thumb.

5. The information processing system according to claim 1, wherein the at least one processor proceeds with the specific mode until a predetermined motion is detected after the operation mode is switched to the specific mode even if the captured image does not include the image of the nail of the thumb or the image that enables the estimation of the presence of the nail of the thumb.

6. The information processing system according to claim 5, wherein the predetermined motion comprises a motion for releasing the positionally-changed virtual object.

7. A non-transitory computer readable medium storing a program causing a computer to execute a process, the process comprising:
  controlling a camera to capture images, including an image of a thumb of a user;
  controlling a display to display, to the user, a virtual space with a virtual object disposed within the virtual space;

acquiring, with at least one processor associated with the computer, the image of the thumb of the user; and switching, with the at least one processor, an operation mode for the virtual object to a specific mode for positionally changing the virtual object if the captured image includes an image of a nail of the thumb or an image that enables estimation of presence of the nail of the thumb.

8. A method of display processing comprising:

controlling a camera to capture images, including an image of a thumb of a user;

controlling a display to display, to the user, a virtual space with a virtual object disposed within the virtual space;

acquiring, with at least one processor, the image of the thumb of the user; and switching, with the at least one processor, an operation mode for the virtual object to a specific mode for positionally changing the virtual object if the captured image includes an image of a nail of the thumb or an image that enables estimation of presence of the nail of the thumb.

* * * * *